United States Patent [19]

Duivelaar

[11] Patent Number: 4,855,082
[45] Date of Patent: Aug. 8, 1989

[54] PROCESS FOR RENDERING HARMLESS DANGEROUS CHEMICAL WASTE

[75] Inventor: Machiel N. Duivelaar, Maassluis, Netherlands

[73] Assignee: Willy De Roode, Maassluis, Netherlands

[21] Appl. No.: 647,627

[22] Filed: Sep. 5, 1984

[30] Foreign Application Priority Data

Sep. 9, 1983 [NL] Netherlands .......................... 8303132

[51] Int. Cl.⁴ ............................................... G21F 9/16
[52] U.S. Cl. ....................................... 252/629; 65/17; 65/66; 501/152; 501/155; 264/0.5
[58] Field of Search ........................ 252/629, 631, 628; 501/152, 153, 154, 155

[56] References Cited

U.S. PATENT DOCUMENTS

| | | | |
|---|---|---|---|
| 3,262,885 | 7/1966 | Rushbrook | 252/629 |
| 3,321,409 | 5/1967 | Grover et al. | 252/629 |
| 3,340,202 | 9/1967 | Olombel et al. | 252/629 |
| 3,365,578 | 1/1968 | Grover et al. | 252/629 |
| 3,959,172 | 5/1976 | Brownell et al. | 252/629 |
| 4,404,129 | 9/1983 | Penberthy et al. | 252/629 |
| 4,490,287 | 12/1984 | Hardwick et al. | 252/629 |

FOREIGN PATENT DOCUMENTS

| | | | |
|---|---|---|---|
| 0028670 | 5/1981 | European Pat. Off. | 252/629 |
| 2756145 | 6/1979 | Fed. Rep. of Germany | 252/626 |
| 0050268 | 9/1977 | Japan | 252/629 |
| 2099207 | 12/1982 | United Kingdom | 252/629 |

Primary Examiner—Howard J. Locker
Attorney, Agent, or Firm—Bauer & Schaffer

[57] ABSTRACT

Organic or inorganic chemical waste material is incorporated in ordinary silica-glass by mixing the two in liquid condition under pressure in a container, and thereafter cooling the mixture and solidifying it in shapes like cylinders, rods or pellets. The container may be a rotary mixing cylinder, a stationary extruder, or for inorganic material, a widened portion of a glass supply conduit wherein the mixture is vibrated.

5 Claims, 3 Drawing Sheets

PROCESS FOR RENDERING HARMLESS DANGEROUS CHEMICAL WASTE

BACKGROUND OF THE INVENTION

The present invention relates to a process for rendering harmless, dangerous chemical waste material by mixing it with a mineral material, and in particular, to a process and apparatus for encapsulating waste material in ordinary glass.

A process is known in which the mineral material comprises complex barium and calcium-titanates. Particularly, these processes are adapted to form a solid solution with radioactive acid wastes which are released by the spent fuel by nuclear reactors. Thereafter, the obtained solid powder is filled into metal containers, and compressed at high pressure and temperature into discs. The discs may be stored in a so-called waste container, having a lead shield, known for storing radioactive waste. The containers may be stored in the sea or below earth level. The solid material is stable and resistant to all geochemical and geological circumstances over long periods. The process is known as the Synroc-process.

There is also a known process wherein radioactive waste is melted at a temperature of about 1150-1400 degrees Centigrade in boro-silicate glass whereafter the melt is solidified in the shape of marbles or pellets on a rotating plate and the pellets are filled into steel containers filled with molten lead. The containers have a double outer wall, which likewise is filled with lead.

The present invention has as its object the rendering harmless of organic and inorganic chemical waste in a less expensive way than with the above mentioned known processes. Moreover, it is an object of this invention to employ a mineral material with which the waste material may be incorporated and which remains intact under all conceivable circumstances so that the chemical waste cannot again be set free. The process may also be used for nuclear waste if suitable additional measures are taken.

SUMMARY OF THE INVENTION

According to the present invention, the foregoing objects are achieved in that the waste material, which is in liquid or powder condition, is supplied to a closed container, the air present in said material is removed through evacuation of the container and in this condition the material is mixed under pressure with liquid silica glass of the ordinary commonly available types and after completion of the mixing, the mixture solidified through cooling in the shape of cylinders, rods, blocks, pellets or similar objects.

The advantage of the use of common silica glass is that it is cheap and, moreover, has a lower melting point than the special borosilicate glass (800 degrees Centigrade instead of 1150-1400 degrees Centigrade) whereby less heating heating costs are involved and at which lower temperature the corrosivity of the glass is much less.

Free oxygen has to be removed from the waste material since due to the high temperature of the liquid glass, the oxygen could react with the waste material and give rise to explosion.

The formed cylinders, blocks or pellets are harmless and may be dumped into the sea where moreover, they may grow algae or similar organisms in a relatively short time.

Under certain circumstances, e.g. when the waste material comprises a great deal of air, it may be advantageous to heat the waste material prior to evacuation, in a separate container, thus driving out at least part of the air present therein.

Preferably the mixing, for inorganic waste material, may take place simultaneously with the extrusion of the molten glass into the container having the waste material. For organic waste material the reverse sequence is preferred: the waste material being first pressed into the molten glass, whereby it is destroyed in greater part by the occurring pyrolysis.

The invention also relates to an apparatus for carrying out the processes according to the invention.

The apparatus is characterized in that the container is a mixing cylinder provided with an evacuating conduit, supply means for supplying waste material and supply means for supplying liquid glass.

In a first embodiment according to the invention, the mixing cylinder is drivable in rotation around its own axis and is provided with a helical groove in its interior wall. An apertured mixing grid engages in the helical groove and is thus reciprocal in the longitudinal direction of the cylinder due to the rotation of the cylinder. A removal piston is located opposite the grid and is reciprocal by outside force in the longitudinal direction of the cylinder to remove the mixed material.

In order to remove the mixture which has solidified into plastic condition from the cylinder, it is advantageous if the mixing cylinder is pivotable by means of pivot pins to a position in which it may be connected to cooling means and to a glass extrusion apparatus, in which position the removal piston is drivable in the direction of the glass supply connection of the cylinder.

In a second embodiment the container is a stationary mixing cylinder comprising two longitudinal halves, and provided with a central shaft which is rotatably driven. A helical transportation blade and/or series of mixing blades are provided on the shaft. A waste material supply connection as well as a glass supply connection are provided at the end of the mixing cylinder opposite to the discharge end thereof. The discharge end is also provided with cooling coil and with an extrusion nozzle.

As a result, the material is continuously extruded in the shape of a strand which may be divided into rods or in short pieces, which subsequently may be pressed into pellets, marbles or other shapes.

In a third embodiment, which is particularly suitable for inorganic material, the container comprises a part of the glass supply conduit, which may be widened, and within which a waste material supply conduit opens. The waste supply conduit is provided along the portion present within the glass supply conduit with uniformly spaced outflow apertures. The entire combination of conduits is preferably received in a vibrating housing.

This latter embodiment is not provided with an evacuating conduit since no oxygen has to be removed from inorganic chemical waste material. Also in this embodiment primarily a rod shaped intermediate product is obtained.

The invention will hereunder be further explained with reference to the drawing, given as examples, of the apparatus according to the invention.

DESCRIPTION OF THE INVENTION

Figure 1:
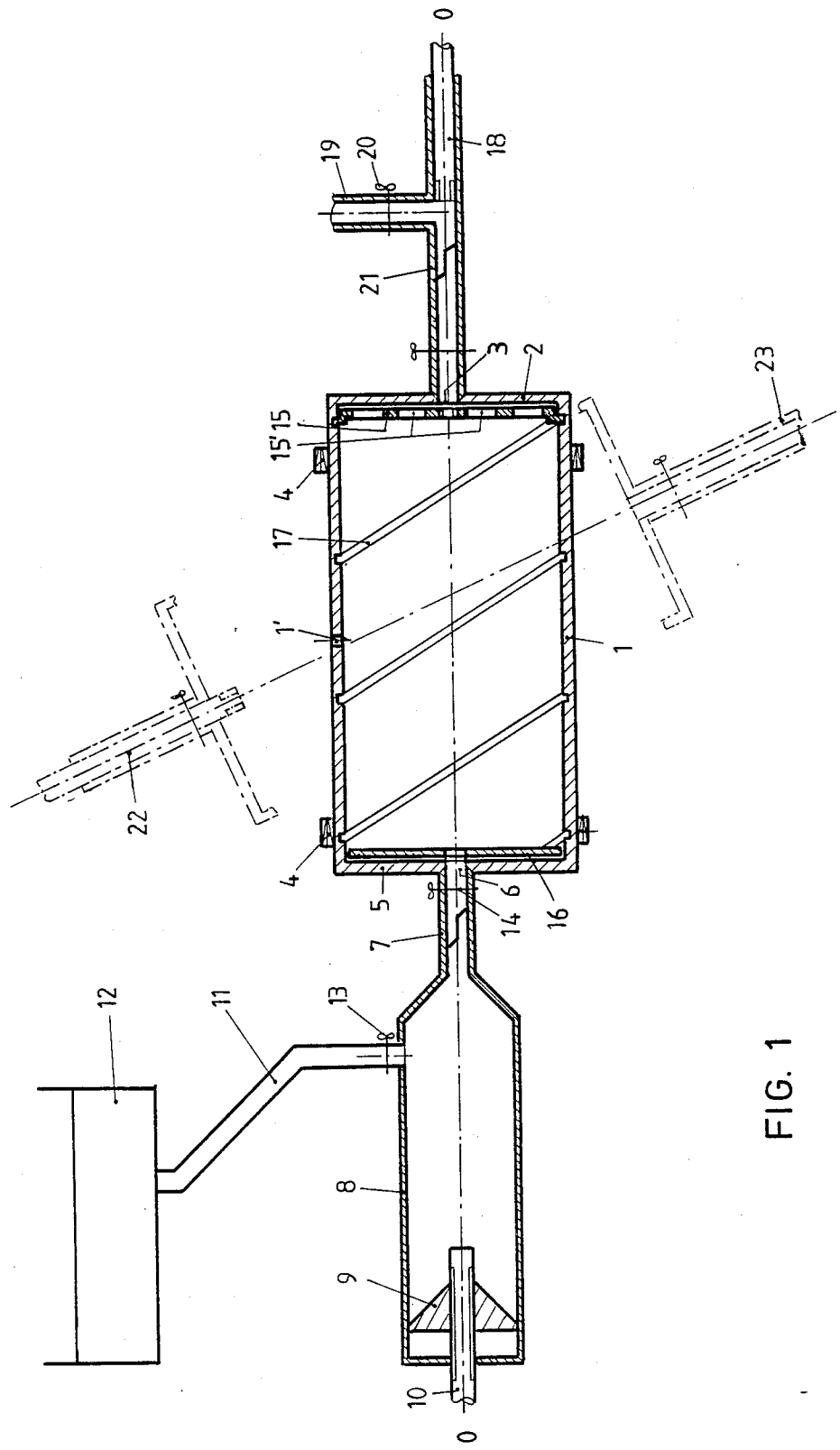
FIG. 1 is a schematic view of an embodiment of apparatus for practicing the process of the present invention.

The first embodiment of the apparatus illustrated in FIG. 1 comprises a longitudinally split cylinder 1, divided in two halves along a central diametric plane, the halves of which are mutually connectable and the cylinder hermetically closable in known manner. The cylinder is split into two halves in order to be able to easily clean its interior. The cylinder is provided at one end, the right end as seen in FIG. 1, with an endwall 2, having a central aperture 3 and is rotatable about its longitudinal axis by suitable drive means, connected appropriately to ring gears 4 mounted on the outer circumference of the cylinder. In the left end wall 5, as seen in FIG. 1, of the cylinder, a central aperture 6 is provided which is connected with a supply conduit 7 for the waste material. A metering cylinder 8 is connected at the other end of the supply conduit 7. A piston 9, secured to a piston rod 10, is reciprocatingly drivable, e.g., by means of a hydraulic drive unit (not shown) within the metering cylinder 8. The piston rod 10 is sealingly journalled in the endwall of the metering cylinder 8.

A feed conduit 11 leading from a container 12, in which a supply of waste material is held, enters into an opening in the cyliner 8. A valve 13 is provided in the feed conduit 11, whereby an opening and closing the supply of waste material is received by the metering cylinder 8 from the container. Likewise, a valve means 14 is provided in the supply conduit 7 between the metering cylinder 8 and the main cylinder 1.

Figure 4:
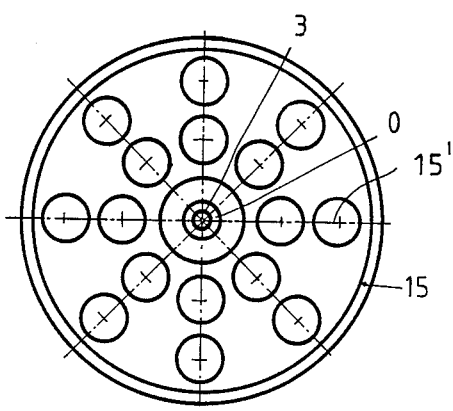
FIG. 4 is an elevational view of the mixing grid employed in the first embodiment.

A mixing grid 15 is located within the main cylinder 1 adjacent its forward end wall 2 as shown in FIG. 1. The mixing grid 15 is plate shaped although it may be differently shaped and as shown, enlarged in FIG. 4, is provided with a plurality of apertures 15' arranged in regularly spaced manner. At the rear or left end wall 5 of the cylinder, there is located a removal plate 16, which is without any holes or apertures.

The peripheral edge of the mixing grid 15 is in engagement with a helical groove 17 formed in the interior wall of the cylinder 1, and is secured to a drive rod 18 which is prevented from rotating in a conventional manner, not shown. The drive rod 18 extends through the outlet 13 and through a co-axial conduit 21, into which opens a glass feed conduit 19, leading from a supply of molten glass (not shown). On the other hand, the removal plate 16 does not ride in the groove 17, but slides along the surface of the cylinder 1.

During the supplying of the waste material a vacuum conduit (not shown) is connected to an aperture 1' in the cylinder wall for evacuating gasses and vapors which may be produced due to the residual high temperature of the cylinder, caused by a previous charge.

To charge cylinder 1 the valve 13 is opened, filling the metering cylinder 8 with a predetermined volume of waste material, e.g., liquid organic material. Thereafter, the valve 13 is closed and the valve 14 is opened and the piston 9 is moved to the right, whereby the waste material is forced into the cylinder 1. After the valve 14 has been closed, molten glass is supplied through the molten glass supply conduit 19. A valve 20 controls the flow of molten glass from a melting furnace (not shown) into the conduit 21 which flows via the discharge opening 3 into the cylinder 1. Thereafter, the vacuum conduit is uncoupled from the cylinder and the cylinder 1 is rotated by the drive means (not shown). Due to the cooperation between the grid 15 and the rotating groove 17, the grid is moved to the left with uniform velocity.

The cylinder 1 as well as the glass supply conduit 21 may be heated, if necessary, in order to maintain their temperatures and prevent premature cooling of the glass.

As seen in FIG. 4, the apertures 15' in the mixing grid 15 are arranged such that adjacent the cylinder axis 0—0 there is a larger cross-section for the passage of material than at its circumference, so that the glass mainly passes adjacent to the grid axis and thereafter is moved towards the cylinder circumference by the centrifugal forces generated by the rotation of the cylinder. Thereby an intimate mixing of the glass with the waste material is obtained in the cylinder 1 and after about one minute the direction of rotation of the cylinder may be reversed, whereby the mixing grid 15 is again moved towards its starting position, i.e., the right in FIG. 1. Thereafter the rotation is stopped.

The cylinder 1 and the conduit 7 and likewise the cylinder 1 and the conduit 21 are connected by separable coupling connections such that the cylinder may be pivoted about an axis transverse to the longitudinal axis to the position which is schematically shown in dot-dash lines in FIG. 1. In this position, a pusher rod 22 may be moved, e.g., hydraulically driven, into the opening 6 in the rear endwall 5 of the cylinder after sufficient cooling of the mixture has been obtained. The pusher rod 22 engages the removal plate 16 and pushes it towards the forward end of the cylinder, whereby the contents are pressed outwardly through the outlet 3 in the forward end wall 2 into a conduit 23. The conduit 23 may be connected to a machine for manufacturing pellets or marbles or differently shaped objects from the glass mass, whereby the objects contain the waste material, so that it is no longer detrimental to the environment.

Thereafter the cylinder 1 is pivoted back to the position which is shown in full lines in FIG. 1 and the removal plate 16 is moved back to its starting position by the pusher rod 23 whereafter a further cycle may be started by introducing a new charge from the waste supply.

In order to increase its life, the mixing cylinder 1 may interiorly be provided with a ceramic coating.

It is also possible to drive the mixing grid 15, rather than by the groove 17 and the cylinder rotation, by connecting the rod 18, secured to the grid 15' to a hydraulic linear drive. It is also envisaged to enter the waste material as well as the glass into the cylinder by means of a pump but in this case it must be guaranteed that no air enters into the cylinder which may result in the danger of explosions.

Figure 2:
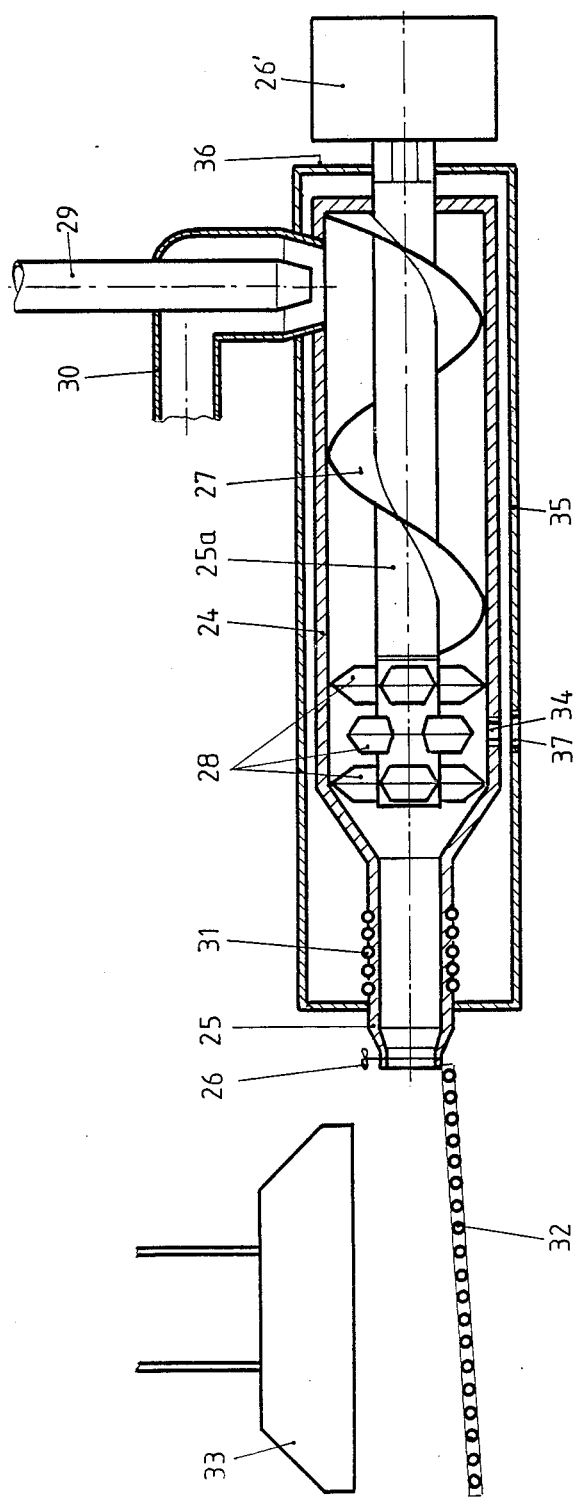
FIG. 2 is a similar view showing a second embodiment.

In FIG. 2 a different embodiment of the apparatus is shown. This comprises an extrusion cylinder 24, having a nozzle 25 and a closure valve 26 adjacent to the nozzle. The extrusion cylinder 24 has a central shaft 25a which is drivable through a motor 26'. A helical blade 27 is formed on the shaft 25a, the circumferential edge of the blade 27 engaging the interior cylinder wall of the extrusion cylinder 24. The forward tip of the shaft 25a is provided with a number of radial blades 28. The right hand end of the cylinder, as seen in FIG. 2, is connected with a waste supply conduit 29 and with a glass supply conduit 30. The glass supply conduit 30 is in this embodiment provided coaxially around the waste conduit 29. Surrounding the nozzle 25 is a cooling coil 31 adapted to cool the extruded mass of waste and glass so that it leaves the nozzle in a plastic condition. The exiting plastic strand may be carried away on a roller conveyor 32. If desired, the strand may be divided into pieces. Also the exit end of the cylinder may be connected to a pelletising machine or similar apparatus.

In order to prevent noxious vapors, which possibly still adhere to the mass, from entering the environment when the strand is discharged, suction means 33 may be provided in a hood over the roller conveyor.

It will be clear, that when simultaneously metered quantitites of waste material and molten glass are supplied, these are mixed by the mixing helical blade 27 and thereafter by the radial mixing blades 28. Any residue may be taken from the cylinder through a closable aperture 34 at the bottom of the cylinder. For safety reasons the extrusion cylinder 24 is surrounded by a housing 35, provided with a vacuum conduit inlet 36. Opposite to the discharge aperture 34 a corresponding discharge aperture 37 is provided in the housing.

Figure 3:
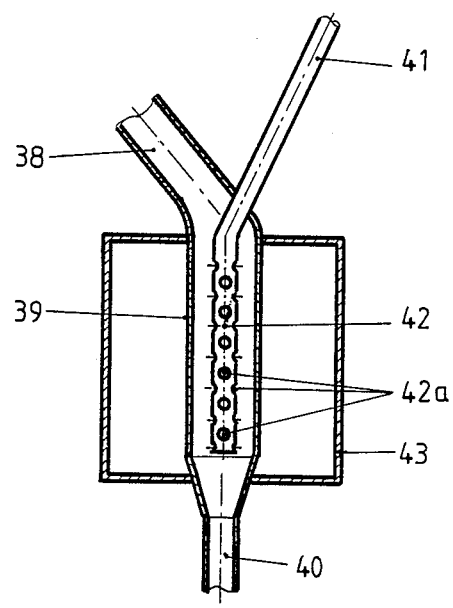
FIG. 3 is yet another view showing a third embodiment.

A third embodiment of the apparatus according to the invention is shown in FIG. 3. Here a glass supply conduit 38 is provided having a somewhat widened portion 39 and a narrowed discharge portion 40. A waste supply conduit 41 for inorganic waste material extends sealingly through the wall of the glass supply conduit 38 and has an end portion 42 within the widened portion 39 of the glass supply conduit. The end portion 42 of the waste supply conduit is provided with apertures, regularly spaced around its circumference. Molten glass and waste material are simultaneously supplied, the waste material under a pressure of 3–4 atmosphere (bars) whereby the waste material is injected directly into the liquid glass supplied in the conduit 38. The widened portion 39 of the glass conduit and the end portion 42 of the waste material conduit are received in a housing 43, which is connected with a vibrating system (not shown). During the supply of glass and waste, the housing 43 is vibrated so that the intimate mixing of waste material and glass is enhanced. The mixture is carried through the conduit portion 40 to a pelletising machine or similar machine (not shown).

There is no provision for evacuating vapors in this embodiment and therefore it is only suitable for inorganic waste material, such as stone, metal, particularly heavy metals, such as mercury and so on. If desired, the housing 43 may be surrounded by a second housing having an evacuating conduit like in the second embodiment.

The vibrating system may be replaced by a device issuing high-frequency sound vibrations. In both cases the mixing is furthered but in addition, the apertures in the end portion 42 of the waste conduit are kept unclogged.

It will be clear that the embodiments according to FIGS. 2 and 3 relate to a continuously operating apparatus, contrary to that according to FIG. 1.

A valve 26 at the mouth of the extrusion cylinder 25 of the embodiment according to FIG. 2 serves to permit closing of the extrusion cylinder if any breakdown occurs, since otherwise air could enter the apparatus and could reach the waste material in the conduit 29, whereby explosions or fire could occur. Also air could enter the glass conduit, which is undesirable.

All kinds of dangerous waste material may be incorporated into low cost glass by the process and apparatus according to the invention, as a result of which the material becomes harmless, and may be dumped at any place. If desired, the corporate material may be used for strengthening and building river banks or for similar purposes. Inorganic material may be recovered from the corporate by again melting the glass pellets, if at that time it would be economically justified to reuse them. It is envisaged to wash the obtained pellets or other objects in an alkaline bath so as to remove any possible adhering toxic remnants prior to the use of the pellets.

I claim:

1. A process for incorporating chemically dangerous waste material in solid silica glass to render said waste harmless comprising the steps of converting ordinary solid silica glass into a liquid, mixing the waste material with the liquid glass in a closed container under high pressure and high temperature, and thereafter cooling said mixture, removing said mixture from said container and forming said mixture into shaped units for disposal.

2. The process according to claim 1 including the step for evacuating air from said waste material prior to its mixture with said liquid glass.

3. The process according to claim 2, wherein the waste material is preheated prior to its mixture with said liquid glass in a separate container prior to evacuation.

4. The process according to claim 2 wherein when the waste material is inorganic, the waste material is supplied to said container initially and said liquid glass thereafter extruded into said container under pressure.

5. The process according to claim 2 wherein when the waste material is organic, the liquid glass is supplied to said container initially and thereafter waste material is extruded into said container for incorporation into the liquid glass.

* * * * *